United States Patent
Price et al.

(10) Patent No.: US 12,496,170 B2
(45) Date of Patent: Dec. 16, 2025

(54) DENTAL BAR

(71) Applicant: MJP ELITE STUDIOS LIMITED, Ripon (GB)

(72) Inventors: Mark Jerome Price, Ripon (GB); Steven William Campbell, Ripon (GB)

(73) Assignee: MJP Elite Studios Limited, Rippon (GB)

( * ) Notice: Subject to any disclaimer, the term of this patent is extended or adjusted under 35 U.S.C. 154(b) by 770 days.

(21) Appl. No.: 17/768,751

(22) PCT Filed: Oct. 1, 2020

(86) PCT No.: PCT/GB2020/052402
§ 371 (c)(1),
(2) Date: Apr. 13, 2022

(87) PCT Pub. No.: WO2021/074588
PCT Pub. Date: Apr. 22, 2021

(65) Prior Publication Data
US 2023/0093315 A1    Mar. 23, 2023

(30) Foreign Application Priority Data
Oct. 16, 2019 (GB) .................................... 1914954

(51) Int. Cl.
  *A61C 8/00* (2006.01)
  *A61C 9/00* (2006.01)
  *A61C 13/275* (2006.01)

(52) U.S. Cl.
  CPC .......... *A61C 8/0095* (2013.01); *A61C 8/0001* (2013.01); *A61C 9/0006* (2013.01); *A61C 8/0048* (2013.01); *A61C 13/275* (2013.01)

(58) Field of Classification Search
  CPC ... A61C 8/0001; A61C 8/0048; A61C 8/0095; A61C 13/2255; A61C 13/26; A61C 13/265; A61C 13/2653; A61C 13/275; A61C 13/277; A61C 2013/2753; A61C 19/055; A61C 9/0006
  See application file for complete search history.

(56) References Cited

U.S. PATENT DOCUMENTS

| | | | |
|---|---|---|---|
| 4,711,631 A * | 12/1987 | Thomsen | A61C 13/26 433/181 |
| 5,219,286 A * | 6/1993 | Hader | A61C 8/0048 433/172 |
| 6,692,254 B1 | 2/2004 | Kligerman et al. | |

(Continued)

FOREIGN PATENT DOCUMENTS

EP        2 913 023 A1    9/2015

*Primary Examiner* — Edward Moran
(74) *Attorney, Agent, or Firm* — Shalom Werstebrger; Saltamar Innovations

(57) ABSTRACT

A dental bar is disclosed for accurately determining the separation and relative orientation of two coping cylinders projecting from dental implants in a patients mouth to receive a prosthesis. The dental bar comprises two sockets, for fitting over and securing to the two coping cylinders, connected to one another by a limb formed of telescopically collapsible sections. The telescoped ections of the limb are of differing cross-sectional shape so as to define between them a volume into which a bonding material may be injected through a port, in order to lock all the limb sections permanently relative to one another.

15 Claims, 4 Drawing Sheets

(56) References Cited

U.S. PATENT DOCUMENTS

| | | | |
|---|---|---|---|
| 6,905,336 B2* | 6/2005 | Summers | A61C 8/0001 |
| | | | 433/214 |
| 8,523,567 B2* | 9/2013 | Allaire | A61C 13/275 |
| | | | 433/174 |
| 2003/0108845 A1* | 6/2003 | Giovannone | A61C 13/2656 |
| | | | 623/901 |
| 2004/0078040 A1 | 4/2004 | Feijtel | |
| 2012/0189985 A1* | 7/2012 | Iglesias | A61C 8/0048 |
| | | | 433/174 |
| 2019/0175307 A1* | 6/2019 | Agliati | A61C 8/0095 |

\* cited by examiner

DENTAL BAR

RELATED APPLICATIONS

This Application claims the right of priority to PCT Patent Application No. PCT/GB2020/052402 filed on Oct. 1, 2020, which in turn claims the right of priority to Great Britain Patent Application No. 1914954.1 filed on Oct. 16, 2019.

FIELD OF THE INVENTION

The invention relates to dentistry and, in particular, to an apparatus and method for improving the procedure of fitting an implant supported bridge.

BACKGROUND

A dental implant is used to support one or more crowns (false teeth) in the mouth of a patient where the root of their natural tooth has failed. The procedure is often expensive, at least in part because the procedure requires several appointments with a dental practitioner. It is well known in the art to install an implant-supported bridge where more than two consecutively placed crowns are required.

The typical implant-supported bridge procedure involves visiting a dental practitioner who will, if necessary, remove the tooth or teeth required using known methods. A drill is then used to make a hole in the jawbone, into which an implant (commonly of titanium or an alloy thereof) is fixed. Attached to the implant is an abutment which is precisely machined to ensure that the crown should sit correctly in the mouth. By "correctly" it is meant that the tooth should project in the same place as adjacent teeth even if the root of the tooth is inclined. The dental practitioner then fixes a coping cylinder to the abutment for the purpose of taking an impression.

An impression of the mouth is taken so that a model of the patient's mouth including the implant locations, can be cast in a laboratory. The dental technician can then use this model, referred to as an analogue, to create the bridge to be fitted. For comfort reasons and to ensure the implant does not fail prematurely, it is vital that the analogue match the patient's mouth accurately.

The current method of producing an analogue includes taking a first impression with the coping cylinders in place. From this impression, a verification jig is formed which comprises a resin bar moulded to fit the patient's mouth and having embedded coping cylinders that should be in alignment with the abutments in the patient's mouth. However, this verification jig is not sufficiently accurate to be used as an analogue. Therefore, once the resin of the bar has set, it is split into as many pieces as there are coping cylinders using a cutting instrument, which also removes a small amount of material leaving a gap of approximately 0.5 mm between each piece. The pieces are sent back to the dental practitioner to be fitted individually into the mouth of the patient. The gaps between the pieces are then filled with a resin similar to that of the bar. This small amount of resin is much less prone to change dimensions compared with the initial impression, and so the bar created by the dental practitioner by filling the gaps is deemed accurate and verified, allowing a verified model of the patients mouth to be created. Sometimes the verification step is repeated to improve accuracy further.

The above process requires a patient to have several sessions with a dental practitioner from the first impression through to the final fitting of the bridge.

EP 2481371 discloses a dental bar for use in the production of a bridge. The dental bar comprises studs to fit over coping cylinders that are connected to one another by limbs made up of telescopically collapsible sections. Each stud is connected to a respective limb section by a ball and socket joint. To hold the studs in the desired alignment, screws are used to lock the telescopically adjustable limb sections relative to one another and to prevent movement in the ball joints.

OBJECT OF THE INVENTION

The aim of the present invention is to reduce the number of sessions required to achieve a verified model of a patient's mouth for an implant supported bridge.

SUMMARY

In a first aspect of the invention, there is provided a dental bar for accurately determining the separation and relative orientation of two coping cylinders projecting from dental implants in a patient's mouth to receive a prosthesis, the dental bar comprising two sockets, for fitting over and securing to the two coping cylinders, connected to one another by a limb formed of telescopically collapsible sections, wherein telescoped sections of the limb are of differing cross-sectional shape so as to define an empty volume therebetween and a port is provided for injecting a bonding material into the or each volume in order to lock all the limb sections permanently relative to one another.

As the telescoped sections have differing cross-sectional shapes, the volume defined between them cannot be a circular annulus of uniform thickness. In some embodiments, the cross-sectional shape of at least one of the telescoped sections is polygonal. In such embodiments, the other telescoped section may be circular or, if polygonal, it may have a different number of sides or the relative size of the sides may differ.

The invention differs from EP 2481371 in that it does not rely on screws. Instead, the sections of the limb are bonded to one another to maintain their relative position permanently.

In an embodiment of the invention, each socket is formed integrally with, or permanently secured to, a respective limb section.

Such an embodiment of the invention differs further from EP 2481371 in that there is no adjustment between the sockets and the telescopically collapsible limb during the adjustment phase of a dental bar. Instead, the sockets are either formed integrally with a section of the bar or, if formed separately, then they are permanently secured in a fixed predetermined position relative to the bar.

In a second aspect of the invention, there is provided a method of manufacturing an accurate model of a mouth fitted with tooth implants, which method includes securing coping cylinders to the implants, providing at least one dental bar formed of two sockets connected to one another by a limb formed of telescopically collapsible sections, fitting the sockets over the two coping cylinders, bonding the sockets to the coping cylinders, injecting a bonding material into all telescopically collapsible sections of the limb to lock the sections permanently to one another, and releasing the coping cylinders from the implants to provide an impression accurately indicative of the relative spacing and orientation of the implants.

BRIEF DESCRIPTION OF THE DRAWINGS

The invention will now be described further, by way of example, with reference to the accompanying drawings, in which.

DETAILED DESCRIPTION OF THE DRAWINGS

A dental bar is used during a patient's visit to the dentist in order to accurately determine the relative position of implants that will be used to support a bridge. Once accurately determined, an analogue of the patient's mouth can be made in a laboratory, with the patient only being required to return to the dentist once more for final fitting of the bridge.

To determine accurately the relative positions, it is necessary for the dental bar to be moveable during an adjustment phase to allow correct positioning, but then the bar must be rigid after the adjustment phase so that the measurements between the implants remain accurate once the bar has been removed from the patient's mouth.

In the context of the present invention, the term "moveable" is intended to mean any means of changing the position of one end of the bar relative to the other, including telescoping, sliding, articulating and the like. Further, the word bar is not intended to limit the bar to any particular cross-section or shape.

Figure 1:
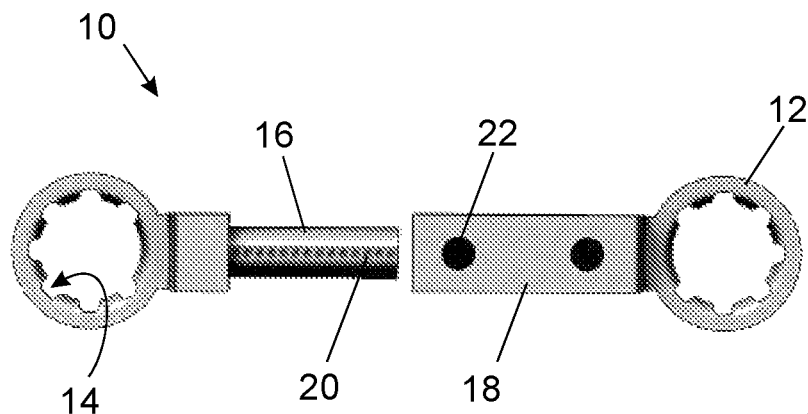
FIG. 1 is a plan view of a dental bar.

FIG. 1 shows a dental bar 10 having two sockets 12 connected to opposite ends of a limb composed of two telescopically collapsible sections 16, 18. The limb section 18 is in the form of tubular housing of square cross section and the limb section 16 is a shaft of circular cross section that fits within the housing 18 and can slide within it. The sockets 12 are permanently secured to the limb sections 16, 18 in predetermined positions and may be formed integrally with the limb sections 16, 18. The sockets 12 are to be attached to coping cylinders (not shown) in the mouth of the patient, the coping cylinders each being attached to a respective implant via an abutment. The bar 10 is adjustable by virtue of the telescoping of the limb sections 16, 18 and so allows the distance between the sockets 12 to be changed.

Furthermore, as the shaft 16 is of circular cross-section, it can be rotated relative to the housing 18 to accommodate abutment surfaces that do not lie in the same plane.

FIGS. 2 to 6 show various configurations of socket 12. Each dental bar 10 may have the same or a different socket type at each end. Each socket 12 may be a closed ring or may instead be a split ring. Where the ring is discontinuous, the socket 12 should extend over more than 180 degrees, preferably more than 270 degrees, in order to improve the security of the fitting on a coping cylinder. The interior surface of the socket 12 may have grooves 14 to aid its grip on to the coping cylinder. In such embodiments, the grooves 14 may correspond to radial protrusions on the coping cylinder to prevent rotation of the dental bar 10 on the coping cylinder.

Figure 3:
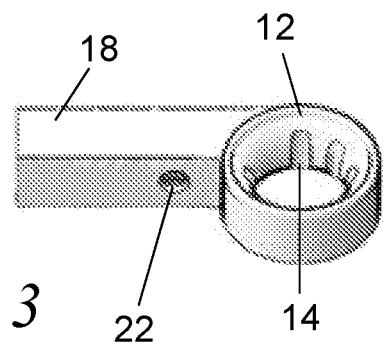
FIG. 3 is a perspective view of a dental bar socket of which the axis is offset from the centre line of the limb section to which it is connected.
Figure 4:
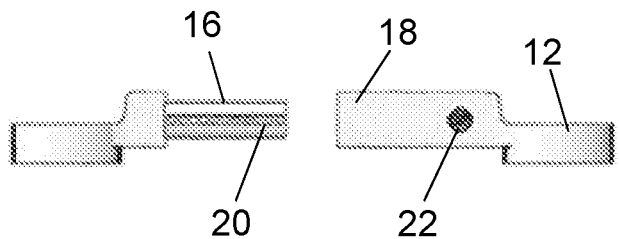
FIG. 4 is a front view of a dental bar having a socket offset in a different plane from that shown in FIG. 3.
Figure 5:
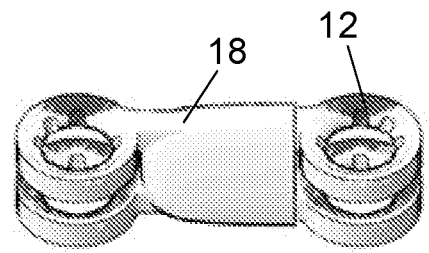
FIG. 5 is a dental bar showing a socket which is split into two rings for interlocking with a further bar.

The sockets 12 may be offset from the axis of the housing in any direction, as shown in FIGS. 3 and 4. In some embodiments, as shown in FIG. 5, the socket 12 may be split into two or more rings with a gap in between, thereby allowing further apparatus, such as another dental bar 10, to link with it.

Figure 6:
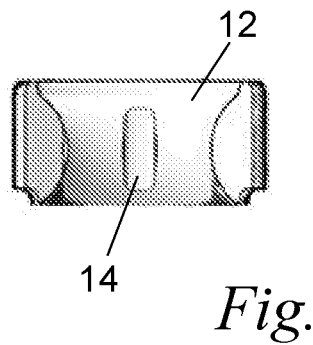
FIG. 6 is a cut-away view of a waisted (venturi-like) socket.

FIG. 6 shows that each socket 12 may have a venturi-like, i.e. waisted, inner surface to allow simple placement of the bar 10 onto the coping cylinders and to accommodate a cylinder with an axis slightly inclined relative to the axis of the socket.

As the shaft 16 is slidable and rotatable within the housing 18, the relative position between the sockets 12 can be adjusted so that the sockets can all be fitted over their respective coping cylinders. The shaft 16 may have a cross-section other than square and may feature grooves or indentations 20 to establish a form locked connection with a bonding material injected into the space between it and the housing 18. The cross-section of the lumen within the tubular housing 18 differs in shape from the cross-section of the shaft and is polygonal, preferably square. As with the shaft 16, the inner surface of the housing may also feature grooves or indentations. Because the cross-sections of the shaft 16 and the housing 18 differ in shape, an empty volume, in the form of an annulus of non-uniform thickness, is inevitably defined between them. The housing 18 has at least one hole or port 22 to allow a bonding material to be injected into the volume between the shaft 16 and the housing 18 once the bar 10 has been correctly adjusted, so that the relative position between the two sockets 12 should remain the same once the bar 10 has been removed from the patient's mouth. The bonding material may be any suitable resin and may for example be an epoxy resin that can be cured rapidly after being injected into the bar. When set, the bonding material thus forms a rigid annulus of non-uniform thickness that is in form locking engagement with at least one, and preferably both, of the housing 18 and the shaft 16 to prevent their relative rotation and axial displacement.

Figure 7:
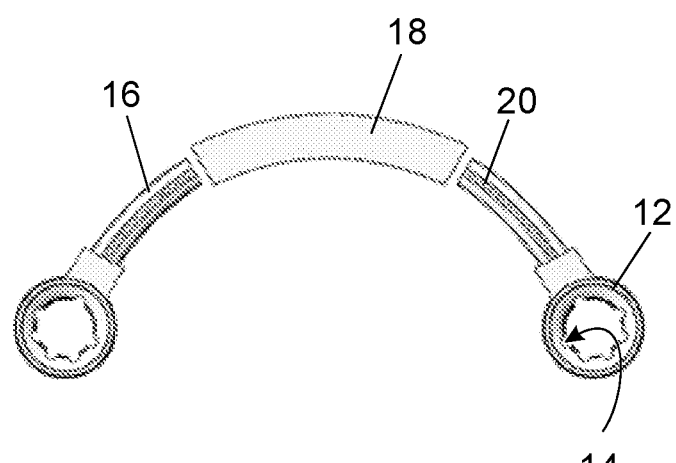
FIG. 7 is a plan view of an embodiment of the invention in which the telescopic limb is curved.

As illustrated in FIG. 7 the bar 10 may be bent to take the shape of the front of the patient's mouth. This figure also shows that the telescopic limb may be formed of more than two sections, in which case the tubular housing 18 may not be directly connected to a socket 12 but may instead act as a hub with a shaft 16 extending from each of its ends, each shaft 16 having a socket 12 attached to its distal end.

Figure 2:
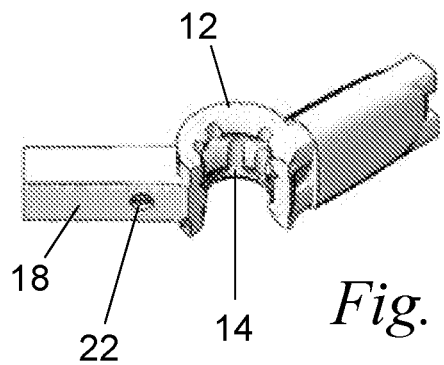
FIG. 2 is a partial perspective view of a dental bar of a second embodiment of the invention.

FIG. 2 shows an embodiment, where a shaft 16 or housing 18 section may extend beyond a coping cylinder without another cylinder to support it, and so may be cantilevered. This may be used, for example, on sections further back in the mouth.

Figure 8:
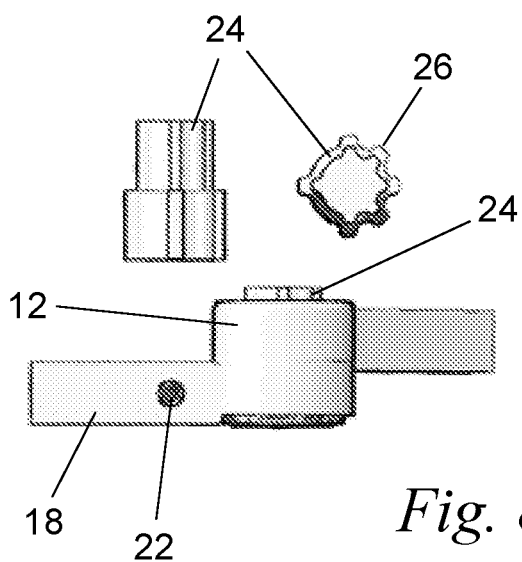
FIG. 8 shows a method of connecting dental bars to one another using a plug.
Figure 9:
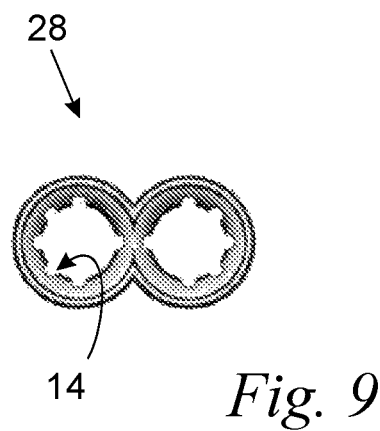
FIG. 9 shows a link for connecting bars and/or coping cylinders directly to one another, for a situation where a further dental bar is not needed.

Dental bars may be jointed to one another in the manner in FIGS. 8 and 9. Such joints may be required when it is not possible, practical, or desirable for the bars 10 to join at an implant site on a coping cylinder.

FIG. 8 shows a plug 24 inserted into two sockets to joint them to one another. Plan and side views of the plug 24 are also shown separately in the drawing. The plug 24, like the coping cylinders, may feature radial protrusions 26 to allow a more secure fitting to the sockets 12.

FIG. 9 illustrates a link 28 made up of two sockets that are directly connected to one another. The link 28 allows complete freedom of design when combined with plugs 24 and multiple dental bars 10.

In use, the first step in forming a verified impression is to place sockets 12 of the dental bar(s) 10 over the coping cylinders which have been installed in the patient's mouth, this being made possible by adjusting the relative position of the sockets 12 using a combination of dental bars 10, plugs 24 and links 28 as necessary. Once installed in the mouth, the relative positions of each bar 10 and of the assembly, as a whole, needs to be fixed. This is done by injecting a bonding material into bonding sites comprising holes 22 formed in the housing(s) 18, and into the interface between the coping cylinders and sockets 12.

Figure 10:
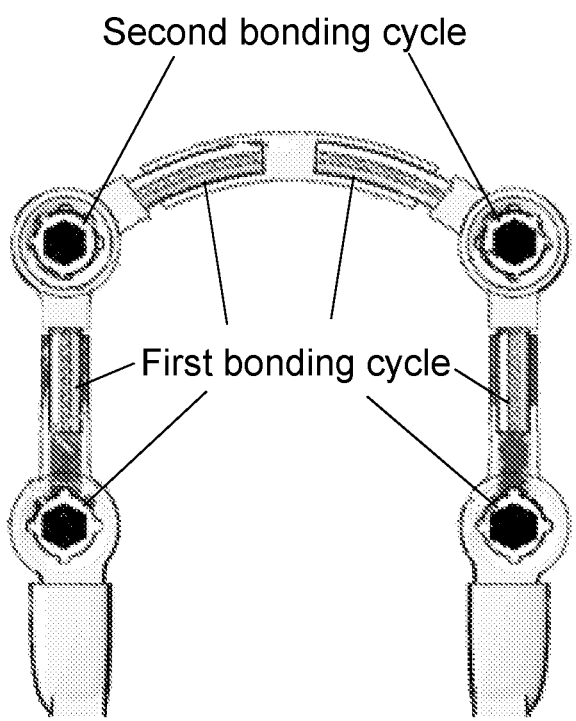
FIG. 10 shows a plan view of a dental bar assembly and a method in which a bonding material is used to accurately set the bars.

To obtain greater accuracy, in some embodiments, not all the bonding sites are filled with bonding material at the same time. In such embodiments, as illustrated in FIG. 10, a first bond cycle allows the positions of the assembly to be fixed. As the bonding material sets, it may shrink slightly. Once the first bonding cycle is complete and the bonding material has set, the remaining bond sites can then have bonding material injected in a second bonding cycle. As the second bond cycle involves injecting less resin than the first, the risk of inaccuracy due to resin shrinkage is much less severe.

Once set, an impression of the patient's mouth is taken in the conventional manner. When the impression putty has hardened sufficiently, the screws holding the coping cylinders in place are unscrewed from the abutments, allowing the bar(s) and all the coping cylinders that are now embedded in the impression, to be separated from the patient's mouth. The impression can then be sent to the laboratory, where dental technicians use the assembly to create an accurate analogue from which the bridge can be manufactured.

Figure 11:
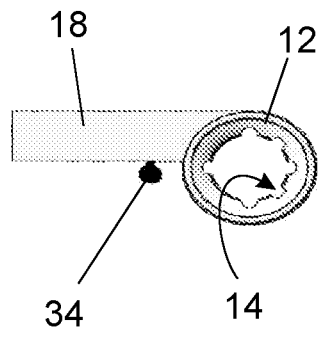
FIG. 11 is a plan view of an offset socket, similar to FIG. 3, but with an adaptor for accepting off the shelf dental components; and, FIG. 12 shows a dental bar with a sleeve, the sleeve featuring a fin for attachment of crowns.

The dental bar may have one or more holes in its body portion, which may be threaded, to enable the acceptance of 'off-the-shelf' components and/or adaptors 34 as shown in FIG. 11.

Figure 12:
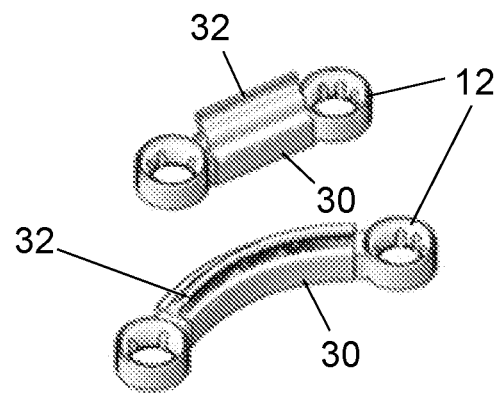

The bar of the invention can also allow a dentist to install a temporary bridge. A dental bar spanning the front of the mouth, as shown in FIG. 12, may be used to achieve 'teeth in a day'. Here a sleeve 30 is bonded to the bar, the sleeve 30 being used to support a temporary bridge of individual teeth. The dental bar offers a strong temporary arch and can therefore be much thinner, resulting in more comfort for the patient, and offers more room in the mouth for natural tongue movement and speech.

The sleeve 30, which can be cut to any desired length, can be bonded to and cover the telescopic limb of the dental bar 10 and may be of a natural tooth colouring. The sleeve may incorporate a fin 32 extending the length of the sleeve 30 to aid attachment of teeth. The fin 32 can easily be trimmed as required, such as in between the prosthetic teeth to give a more natural appearance.

The invention claimed is:

1. A dental bar for accurately determining the separation and relative orientation of two coping cylinders projecting from dental implants in a patient's mouth to receive a prosthesis, the dental bar comprising:

a pair of sockets, each configured for fitting over and securing to one of the two coping cylinders;

a limb comprising at least two telescopically collapsible one-piece sections forming an adjacent pair of telescoped sections, each of a first and a last of the one-piece sections being permanently secured in a fixed predetermined position to a respective socket of the pair of sockets;

within each adjacent pair of telescoped sections, one section being a shaft and the other section being a tubular housing for slidably receiving the shaft, the exterior of the shaft and the interior of the housing section having differing cross-sectional shapes, at least one of the cross-sectional shapes being polygonal;

the shaft and the housing sections of each adjacent pair being operationally coupled and radially defining therebetween an empty volume within the tubular housing; and, a port in fluid coupling with the empty volume, the port permitting injection of a bonding material into the empty volume for locking the telescoping shaft and housing relative to one another upon curing of the bonding material.

2. A dental bar as claimed in claim 1, wherein the other of the cross-sectional shapes is circular.

3. A dental bar as claimed in claim 1, wherein the other of the h cross-sectional shapes is polygonal.

4. A dental bar as claimed in claim 1, wherein the port comprises a hole in the housing, the hole being dimensioned for enabling the bonding material to be injected into the housing to surround the shaft and prevent movement between the shaft and the housing.

5. A dental bar as claimed in claim 4, wherein the shaft is formed with formations to establish form-locking engagement between the shaft and the bonding material.

6. A dental bar as claimed in claim 1, wherein the dental bar is curved.

7. A dental bar as claimed in claim 1, wherein the telescopic limb consists of only two sections with the first socket connected to the shaft and the second socket connected to the housing.

8. A dental bar as claimed in claim 1, wherein at least one socket of the pair of sockets is coupled on a first side to one end of a telescopically collapsible section and is further coupled on a second side to a second telescopically collapsible section.

9. A dental bar as claimed in claim 8, wherein the second section is one of a second telescopically collapsible limb connected to a third socket.

10. A dental bar as claimed in claim 1, wherein at least one socket of the pair of sockets comprises a waisted inner surface configured to allow the axis of the socket to be inclined relative to that of the coping cylinder prior to being bonded thereto.

11. A dental bar as claimed in claim 1, wherein the inner surface of at least one socket of the pair of sockets, includes axially extending grooves.

12. A dental bar as claimed in claim 1, wherein one of the pair of sockets has a central plane, normal to the axis of the socket, that is offset from a central plane of the limb section connected thereto.

13. A dental bar as claimed in claim 1, wherein one of the pair of sockets is formed of two parts that are axially spaced from one another by a gap capable of receiving a second socket, thereby permitting two sockets to be bonded to a common coping cylinder.

14. A method of manufacturing an accurate model of a mouth fitted with at least two tooth implants, the method comprising:

securing at least two coping cylinders to the at least two implants;
 providing at least one dental bar having at least a pair of sockets, each configured for fitting over and securing to one of the at least two coping cylinders, a limb comprising at least two telescopically collapsible one-piece sections forming an adjacent pair of telescoped sections, each of a first and a last of the one-piece sections being permanently secured in a fixed predetermined position to a respective socket of at least the pair of sockets; within each adjacent pair of telescoped sections, one section being a shaft and the other section being a tubular housing for slidably receiving the shaft, the exterior of the shaft and the interior of the housing section having differing cross-sectional shapes, at least one of the cross-sectional shapes being polygonal; the shaft and the housing sections of each adjacent pair being operationally coupled and radially defining therebetween an empty volume within the tubular housing; and, a port in fluid coupling with the empty volume, the port permitting injection of a bonding material into the empty volume for locking the telescoping shaft and housing relative to one another upon curing of the bonding material;
 fitting at least the pair of sockets over the at least two coping cylinders;
 bonding at least the pair of sockets to the at least two coping cylinders;
 locking the shaft and the housing permanently to each other by injecting the bonding material into the port; and,
 releasing the at least two coping cylinders from the at least two implants to provide an impression accurately indicative of the relative spacing and orientation of the at least two implants.

15. A method as claimed in claim 14, wherein the step of bonding at least the pair of sockets to the at least two coping cylinders is performed after the bonding of the telescopically collapsible sections to one another.

\* \* \* \* \*